(12) United States Patent
Thanigachalam et al.

(10) Patent No.: US 8,071,907 B2
(45) Date of Patent: Dec. 6, 2011

(54) BUTTON ATTACHMENT METHOD FOR SAW TORQUE SENSOR

(75) Inventors: Palani Thanigachalam, Bangalore (IN); Raja Narayanasamy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1242 days.

(21) Appl. No.: 11/803,323

(22) Filed: May 12, 2007

(65) Prior Publication Data

US 2008/0277385 A1    Nov. 13, 2008

(51) Int. Cl.
    *B23K 26/00* (2006.01)
(52) U.S. Cl. ......... 219/121.64; 219/121.63; 219/121.78; 219/121.82; 219/121.14; 219/121.13
(58) Field of Classification Search ............ 219/121.64, 219/121.63, 121.85, 121.78, 121.82, 121.14, 219/121.13, 137 WM; 73/862.08
    See application file for complete search history.

(56) References Cited

U.S. PATENT DOCUMENTS

| | | | | |
|---|---|---|---|---|
| 4,593,555 A * | 6/1986 | Krutz et al. | | 73/114.25 |
| 5,603,853 A * | 2/1997 | Mombo-Caristan | | 219/121.64 |
| 5,628,449 A | 5/1997 | Onuma et al. | | |
| 6,439,066 B1 | 8/2002 | Norton | | |
| 6,484,924 B1 | 11/2002 | Forrest | | |
| 6,610,962 B1 | 8/2003 | Warren et al. | | |
| 7,302,864 B2 * | 12/2007 | Liu et al. | | 73/862 |
| 7,395,724 B2 * | 7/2008 | Bunyer et al. | | 73/862.339 |
| 7,412,890 B1 | 8/2008 | Johnson et al. | | |
| 2002/0117485 A1 | 8/2002 | Jones et al. | | |
| 2002/0142183 A1 | 10/2002 | Colligan | | |
| 2004/0182835 A1 | 9/2004 | Hall | | |
| 2005/0035173 A1 | 2/2005 | Steel et al. | | |
| 2005/0051527 A1 | 3/2005 | Kelly et al. | | |
| 2005/0121497 A1 | 6/2005 | Fuller et al. | | |
| 2005/0156010 A1 | 7/2005 | Flak et al. | | |
| 2005/0247763 A1 | 11/2005 | Coleman et al. | | |
| 2005/0263878 A1 | 12/2005 | Potter | | |
| 2005/0274776 A1 | 12/2005 | Takeda et al. | | |
| 2007/0068278 A1 | 3/2007 | Liu et al. | | |
| 2007/0257086 A1 | 11/2007 | Schroeder | | |
| 2008/0174222 A1 | 7/2008 | Kowalski | | |
| 2009/0120995 A1 | 5/2009 | Hallinan et al. | | |

(Continued)

FOREIGN PATENT DOCUMENTS

DE    102005031584    1/2007

(Continued)

OTHER PUBLICATIONS

Reindl, "Wireless Passive SAW Identification Marks and Sensors," 2002 IEEE International Frequency Control Symposium and PDA Exhibition, New Orleans, LA, USA, 115 pages, May 29-31, 2002.

*Primary Examiner* — M. Alexandra Elve
(74) *Attorney, Agent, or Firm* — Seager, Tufte & Wickhem LLC

(57) ABSTRACT

A method for joining dissimilar materials of sensor button for measuring torque is illustrated. The dissimilar materials can be welded together by laser welding. The parts can be cleaned and held together firmly by a fixture and welded with established machine parameters. The method of micro-crack free weld joint can give a robust joint for the life time of the automotive which mandate for the function of torque sensor to facilitate the positive strain transfer from the parent material.

20 Claims, 5 Drawing Sheets

U.S. PATENT DOCUMENTS

| | | |
|---|---|---|
| 2009/0169912 A1 | 7/2009 | Hoyt et al. |
| 2009/0294411 A1 | 12/2009 | Khakhalev |
| 2010/0028085 A1 | 2/2010 | Rocher |

FOREIGN PATENT DOCUMENTS

| | | |
|---|---|---|
| EP | 715922 B1 | 6/1998 |
| EP | 745449 B1 | 5/1999 |
| EP | 1319460 A1 | 6/2003 |
| EP | 1350590 B1 | 7/2006 |
| EP | 1477266 B1 | 4/2007 |
| EP | 1647350 B1 | 5/2008 |
| EP | 1707296 B1 | 8/2008 |
| JP | 20010582383 | 3/2001 |
| WO | 03062605 A1 | 7/2003 |
| WO | 2004067218 A9 | 9/2004 |
| WO | 2009042557 A2 | 4/2009 |

\* cited by examiner

BUTTON ATTACHMENT METHOD FOR SAW TORQUE SENSOR

TECHNICAL FIELD

Embodiments are generally related to sensor housing methods and systems. Embodiments are also related to improvements in a technique for welding dissimilar metals. Embodiments are additionally related to micro crack free laser welding of dissimilar metals in a sensor housing for measuring torque.

BACKGROUND OF THE INVENTION

Surface Acoustic Wave (SAW) Torque Sensing is an emerging technology for automotive, transportation, rail and other similar industries as used in power train to measure the actual torque on board. Significant research and development efforts enhanced mass-production of SAW torque sensors at a cost-effective price. Certain engine, transmission and driveline can often be controlled more precisely using SAW torque technology. Used in appropriate applications, complex control algorithm and system development, test, evaluation and qualification time can often be significantly reduced with real-time torque sensor measurement that can provide feedback for closed-loop control.

The SAW device consists of two piezoelectric elements which sense the strain in the parent material when the torque is applied. Depending upon the torque applied the parent material surface gets strain in the range of 500 to 2000 microstrain. To measure the accurate strain from the parent material, the sensor button needs to have 100% surface contact with the parent material for effective strain transfer. Apart from this functional requirement, the joining should withstand the automotive harsh and corrosive environment and also the centrifugal force created during the high revolutions per minute (RPM) of the parent part. Adhesives used are failing under dynamic conditions and in salt spray test. Similarly, the assembly cycle time is high increasing the product cost, and the adhesive process is not suitable for high volume production because of the difficulty in automation and time consuming curing process.

Many applications are dependent on dissimilar material joints. Due to the different chemical, mechanical and thermal behaviors of materials, dissimilar materials joining present challenges significantly different than similar materials joining. These methods can work for varying applications. The existing solution uses a custom developed adhesive used mainly for metal to metal attachment for aerospace application such as cynoacrylate based adhesives. The adhesive comes with two solutions and needs to be mixed in a proper ratio as defined by the manufacturer and then applied in drops using a dispensing machine Such adhesive needs to be cured at high temperature for longer durations, for example the cynoacrylate based adhesive and the assembly needs to be cured in the thermal chamber for about 20 hours at 170 degree C. Before placing it onto the chamber the surfaces of the shaft and button need to be cleaned without any dirt and grease by neutralizer and conditioner. Apart from this the parent material on to which the SAW sensor housing need be mounted such as Flexplate, output shaft, input shaft of transmission system are quite heavy and this needs to be placed in the thermal chamber for curing. This calls for big thermal chambers and storage space resulting high investment. Also the flatness of the parts is very critical to achieve the better contact surface. The other requirement for using dissimilar material for SAW torque application is, to have maximum strain transfer, high yield strength and low hysteresis.

Based on the foregoing it is believed that a need exists for improved joining method by welding of dissimilar materials using laser welding. By using such a methodology, micro-crack free weld joint can provide a robust joint system for the lifetime of any automobile.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensor methods and systems.

It is another aspect of the present invention to provide for an improved technique for welding dissimilar metals.

It is a further aspect of the present invention to provide for micro-crack-free laser welding of dissimilar metals in sensor housing for measuring torque.

The aforementioned aspects and other objectives and advantages can now be achieved as described herein. A method for joining dissimilar materials of sensor housings for measuring torque is illustrated and described. The dissimilar materials can be welded together by laser welding. The parts can be cleaned and held together firmly by a fixture and welded with established machine parameters. The method of micro-crack-free weld joints can result in a robust joint for the lifetime of automobiles which mandate for the high function of torque sensors to facilitate positive strain transfer from the parent material. The welded joints can be achieved without any micro-cracks and discontinuity of joint will provide good pull strength and resistance against centrifugal force due to high RPM such as 6000 RPM of the engine output shaft.

Various welding process are tried out with various welding parameters and the process is optimized to have robust joints in order to meet the automotive environment. The weld parameters such as pulse peak power, pulse duration, weld speed, peak temperatures, weld depth and controlling the focal length of the beam can be used for welding dissimilar metals and can be used for all automotive sensor mounting near engine or transmission area. The joining method can be used for dissimilar materials such as medium carbon steels AISI 4000, 5000 series and Stainless steel SS 300 series, EN series and SS 400 series.

The ability to manufacture a product using a number of different metals and alloys greatly increases flexibility in design and production. Joining of dissimilar metal combinations is, however, a challenging task owing to the large differences in physical and chemical properties which may be present. Laser welding, a high power density but low energy-input process, provides solutions to a number of problems commonly encountered with conventional joining techniques. Accurate positioning of the weld bead, rapid heating and cooling, low distortion, process flexibility, and opportunities for product redesign are its principal characteristics. This invention describes the principles underlying laser welding of dissimilar metal combinations and highlights the above benefits in a number of practical applications. It can be concluded that there is potential for its application in many industrial sectors.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Laser welding has gained considerable acceptance in the automotive industry because it provides several advantages over other joining processes. Benefits include high productivity, good flexibility, and low maintenance and energy costs along with the ability to produce strong welds. Metal to metal joining requirement of automotive industry are particularly well suited to the laser joining process. Laser welding is usually done without filler metals and the joint clearance should be maintained as close as possible (maximum 100 micron gap allowed).

Figure 1:
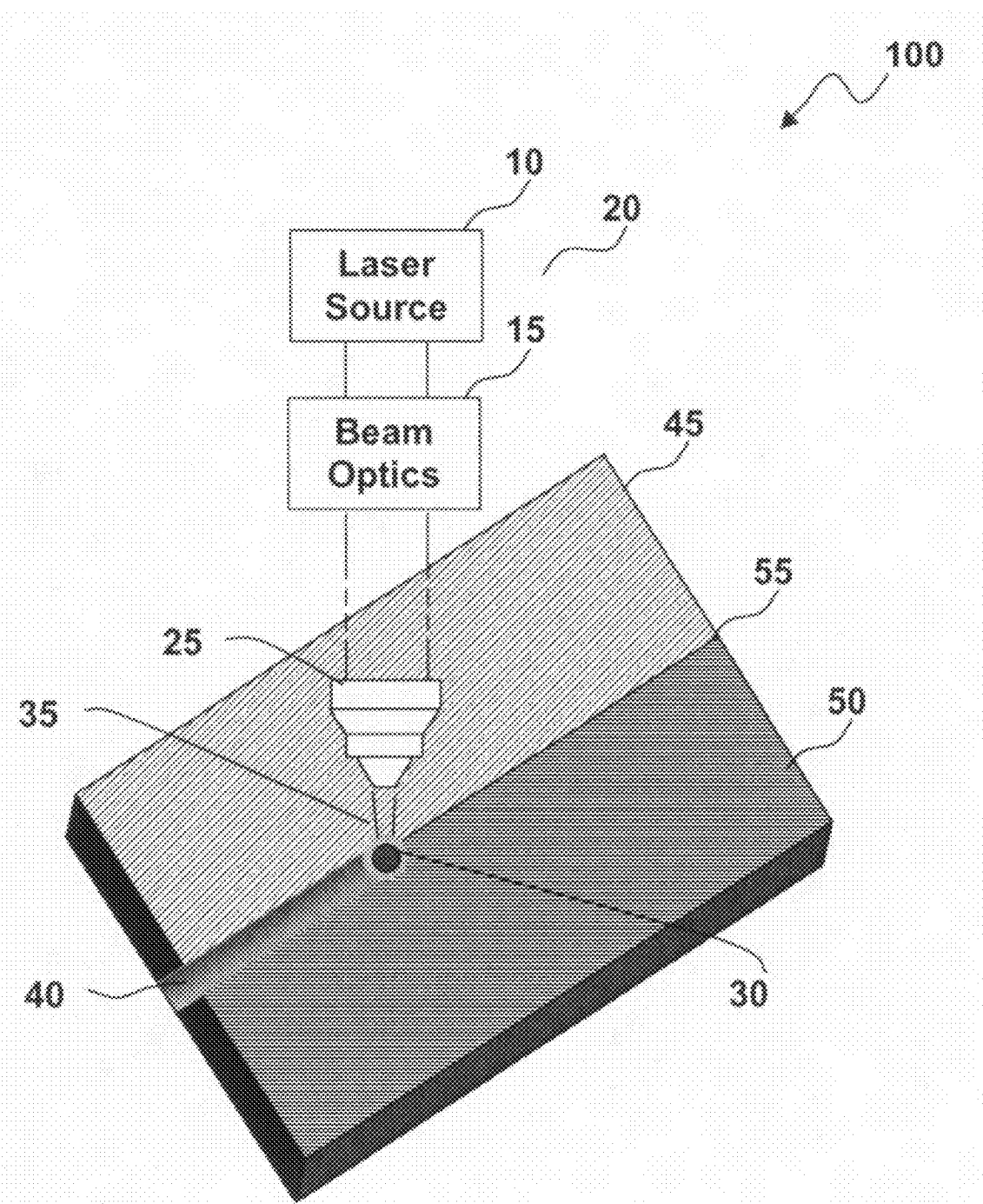
FIG. 1 illustrates a perspective view showing a joint condition of two dissimilar materials when laser welding is performed, which can be implemented in accordance with a preferred embodiment.

Referring to FIG. 1 a perspective view showing a joint condition of two dissimilar materials when laser welding 100 is performed is illustrated, which can be implemented in accordance with a preferred embodiment. A first material sheet 45 can be welded to a second material sheet 50 using high energy density laser beam welding 20 that uses a high energy density radiation laser beam source 10 and beam delivery system, such as the beam optics 15 depicted, to produce a high energy density radiation beam 35 with a focused beam spot 30 in order to join the material sheets 45 and 50 together with a weld 40 that possesses good integrity and high strength. Preferably, a longitudinal axis of the beam spot 30 is oriented generally parallel to the direction of travel of the beam 35 or tangent to a weld line 55 where the sheets 45 and 50 can be in close proximity to each other forming a weld joint 40. The high energy density radiation beam source 10 can be a continuous wave laser, such as a CO laser, HeNe laser, eximer laser or other gas laser, a solid state laser, or an electron beam welder capable of focusing a beam of high energy density radiation to weld two different types of sheet 45 and 50.

The two different types of sheet 45 and 50 should be relatively clean since the welding is very fast with no time to burn-out contaminants. Shield gas is required for more reactive metals but many alloys can be welded in air. Weld heat input and weld shape can be controlled with high energy density radiation laser beam source 10 and beam optics 15 in order to generate welds. Laser welding 100 makes it possible to produce weld joints 40 that acre deep and narrow with small associated heat affected zones (HAZ), as a result of the ability of the laser to deliver energy in a highly focused form. The HAZ and the weld temperature need to be small & low in the range of 0.4 to 0.5 mm and 100 deg C. respectively, this is critical because the sensor housing has the SAW device which will fail at temperatures above 125 degree C. The laser beam 35 can be optically aimed making it possible to weld in locations that would be normally difficult to reach by other welding processes.

Figure 2:
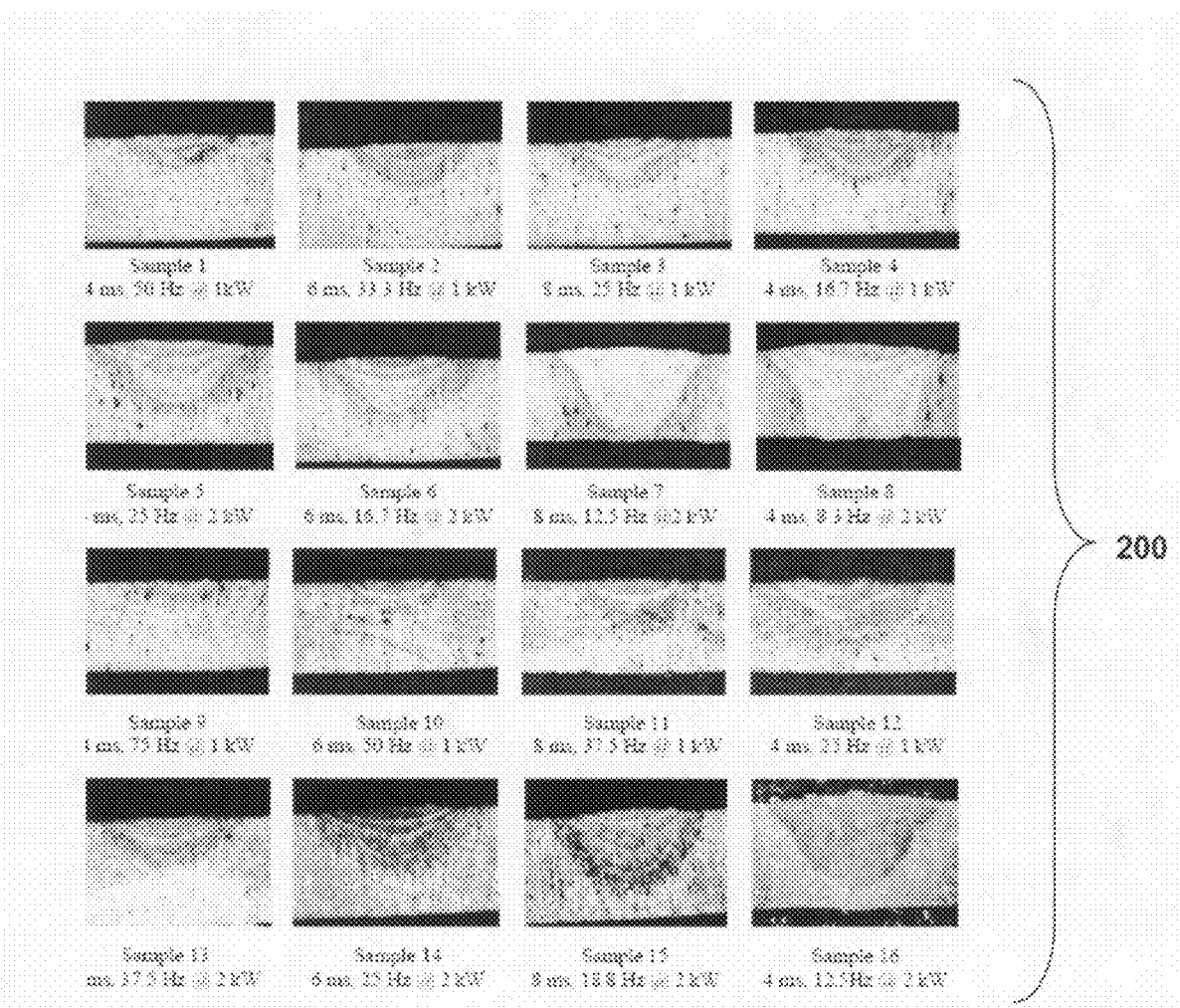
FIG. 2 illustrates a micrograph of a weld bead produced at a weld line/joint showing weld trails for various parameters on EN56 material, which can be implemented in accordance with a preferred embodiment.

Referring to FIG. 2 a micrograph of a weld bead produced at weld joint showing weld trails for various parameters on EN56 material 200 is illustrated, which can be implemented in accordance with a preferred embodiment. The influence of laser parameters on the weld bead geometry and fusion zone characteristics for EN56 steel material is illustrated. The EN56 steel material has no fusion zone cracking tendency. The peak temperatures attained by the component during pulsed laser welding is well below the working range of SAW substrate. The joining method can also be used for dissimilar materials such as medium carbon steels AISI 4000, 5000 series and stainless steel SS 300 series, and SS 400 series. The micro-crack free weld joint 40 will give a robust joint for the lifetime of the automotive and can withstand automotive harsh and corrosive environment. The welded joint 40 can also be achieved without any micro cracks and discontinuity of the joint will give good pull strength of 160 kN that can withstand the centrifugal force.

Figure 3:
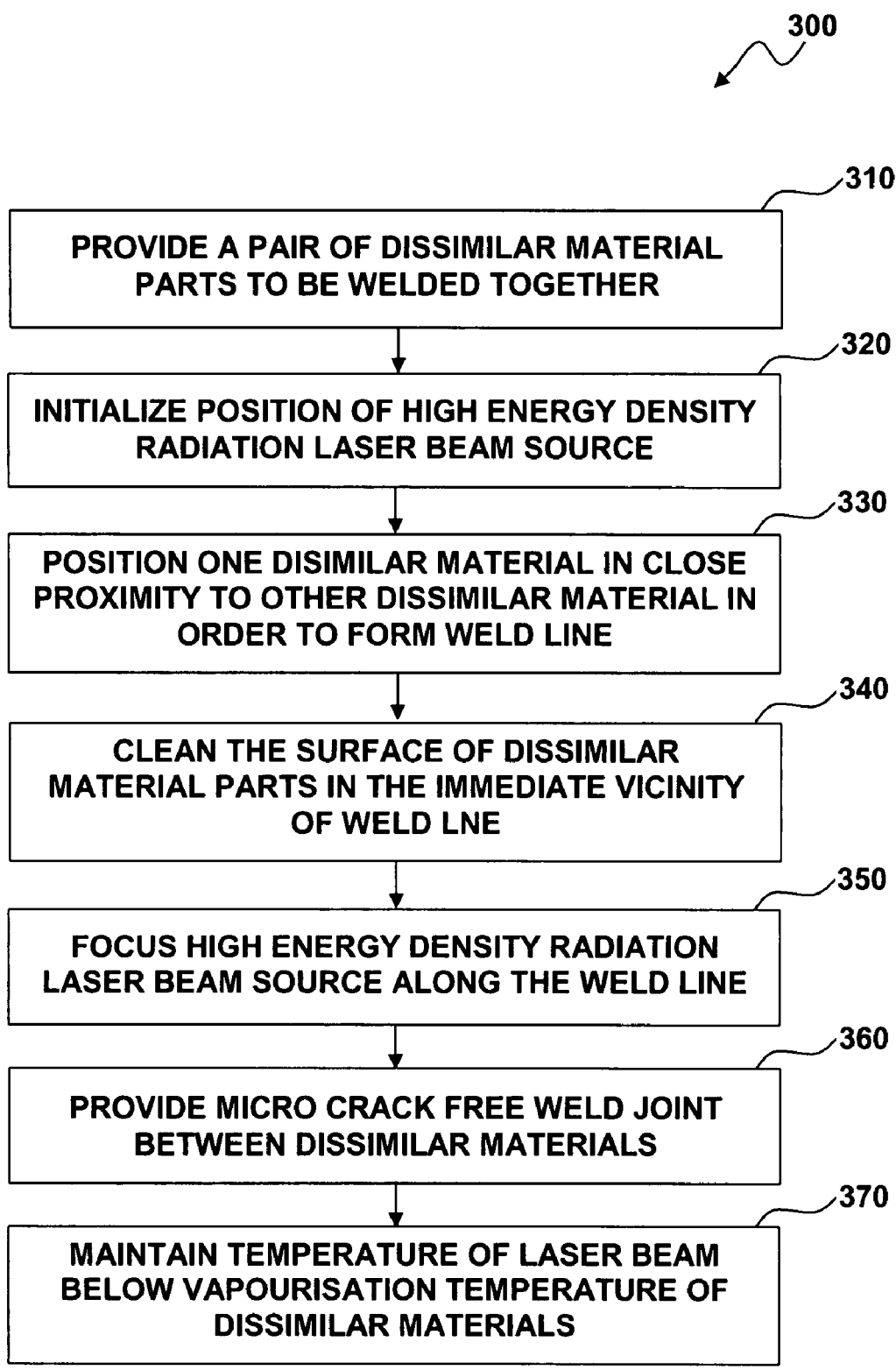
FIG. 3 illustrates a high level flow chart of operations illustrating logical operational steps of a method for joining two dissimilar metals, which can be implemented in accordance with an alternative embodiment.

Referring to FIG. 3 a high level flow chart of operations illustrating logical operational steps of a method for joining two dissimilar metals 300 is illustrated, which can be implemented in accordance with an alternative embodiment. A pair of dissimilar material parts 45 and 50 as shown in FIG. 1 that is to be welded together can be provided, as depicted at block 310. The position of high energy density radiation laser beam source 20 can be initialized, as illustrated at block 320. Thereafter, as depicted at block 330, one dissimilar material 45 can be positioned in close proximity to other dissimilar material 50 in order to form weld line 55. The surface of dissimilar material parts 45 in the immediate vicinity of weld line 55 can be cleaned in order to remove surface contamination, as illustrated at block 340. The high energy density radiation laser beam source 20 can be focused along the weld line 55, as described at block 350. A micro crack free weld joint 40 can be provided between dissimilar materials 45 and 50, as shown at block 360. The temperature of laser beam 15 can be maintained below vaporization temperature of dissimilar materials 45 and 50, as illustrated at block 370.

Figure 4:
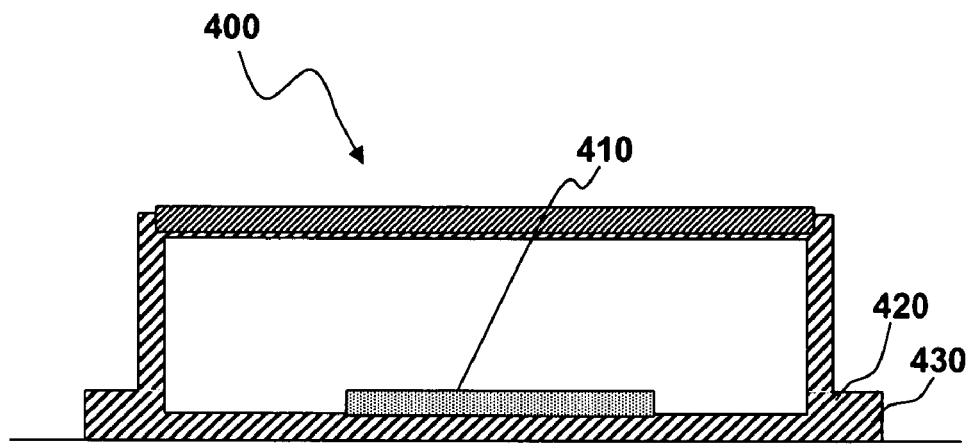
FIG. 4 illustrates a perspective view of a SAW torque sensor which can be implemented, in accordance with a preferred embodiment.

Referring to FIG. 4 a perspective view of a SAW-based sensor 400 is illustrated which can be implemented, in accordance with a preferred embodiment. The SAW-based sensor 400 generally includes a die 410, which is attached to a die-supporting base structure 430. More material can be added to the collar 420 of the base structure 430 in order to have more material for melting while welding.

Figure 5:
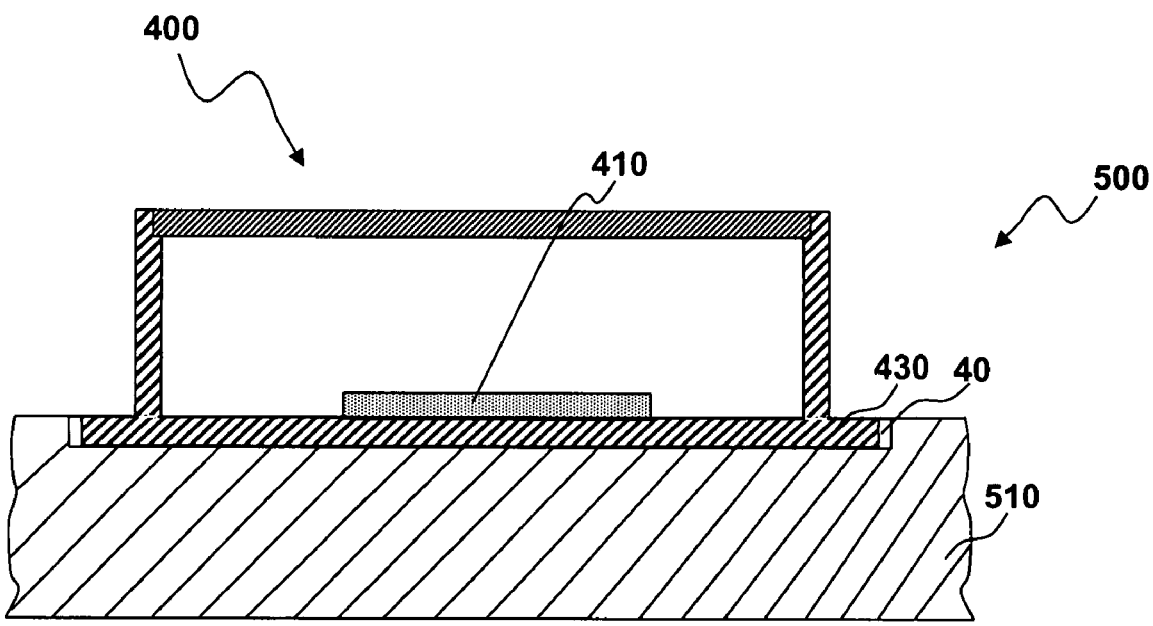
FIG. 5 illustrates a perspective view showing a joint condition of SAW torque sensor with a parent material using button attachment method, which can be implemented in accordance with a preferred embodiment.

Referring to FIG. 5 a perspective view 500 showing a joint condition of SAW torque sensor 400 with a parent material using button attachment method is illustrated, which can be implemented in accordance with a preferred embodiment. Note that in FIGS. 1-6, identical or analogous parts or elements are generally indicated by identical reference numerals. The SAW torque sensor 400 can be welded to a parent material 510 using laser welding process 100 as illustrated at FIG. 1 in order to join the base structure 430 with the parent material 510 together with a weld 40 that possesses good integrity and high strength. The collar 420 of the SAW torque sensor 400 as shown at FIG. 4 can be flushed with the parent material 510 using laser beam welding 20 to have uniform surface and to achieve micro crack free and strong weld joint as illustrated at FIG. 1. Note that the welding process depicted in FIG. 1 can be adapted for use with the SAW torque sensor 400 for joining the base structure 430 with the parent material 510. The micro crack free weld joint 40 can give a robust joint for the life time of the automotive which mandate for the function of a SAW torque sensor 400. The temperature measured during this welding process is below the working range of SAW die 410 hence there is no damage to the SAW sensor 400.

Figure 6:
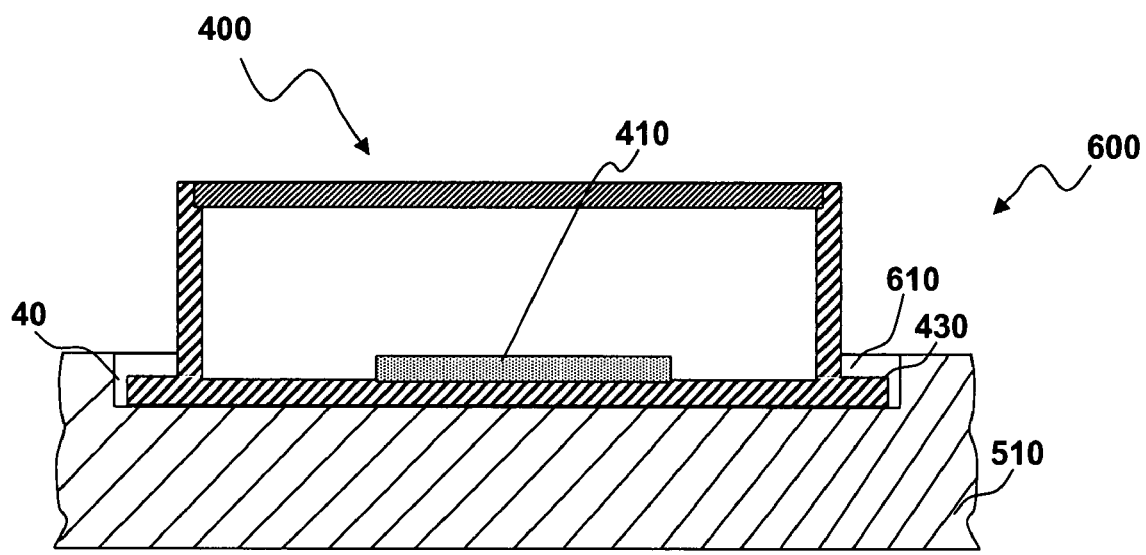
FIG. 6 illustrates another perspective view showing a joint condition of SAW torque sensor with a parent material using button attachment method, which can be implemented in accordance with a preferred embodiment.

Referring to FIG. 6 another perspective view 600 showing a joint condition of SAW torque sensor 400 with a parent material using button attachment is illustrated, which can be implemented in accordance with a preferred embodiment. Note that in FIGS. 1-6, identical or analogous parts or elements are generally indicated by identical reference numerals. The parent material 510 includes a circular pocket 610 to house the SAW sensor 400. Various welding process are tried out with various welding parameters and the process 100 is optimized to have robust joint to meet the automotive environment. These weld parameters can be used for welding dissimilar metals such as the base structure 430 with the parent material 510 of the SAW torque sensor 400 and can be used for all automotive sensors mounting near engine and transmission area. The method of micro-crack free weld joint 40 can give a robust joint for the life time of the automotive which mandate for the function of torque sensor 400 to facilitate the positive strain transfer from the parent material 510.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for assembling a sensor package, comprising:
providing a sensor and a pair of dissimilar material parts to be welded together, wherein the sensor is fixed relative to at least one of the pair of dissimilar material parts;
positioning said pair of dissimilar material parts in close proximity one to the other, thereby forming a weld line; and
cleaning the surfaces of said pair of dissimilar material parts in the immediate vicinity of said weld line in order to remove surface contamination prior to the fusion of said pair of dissimilar material parts;
clamping said pair of dissimilar material parts in order to assure good alignment and to eliminate relative motion at said weld line during welding;
directing a high energy density beam to said weld line thereby creating a weld in order to join said pair of dissimilar material parts; and
wherein during said directing step, a temperature of said weld is maintained below a vaporization temperature of each of said pair of dissimilar material parts.

2. The method of claim 1 wherein at least one of said pair of dissimilar materials are selected from the group consisting of carbon steel and stainless steel.

3. The method of claim 1 wherein said pair of dissimilar materials are carbon steel and stainless steel.

4. The method of claim 1 wherein said high energy density beam is a laser beam.

5. The method of claim 1 wherein said weld is substantially free of solidification cracks.

6. The method of claim 1 wherein during said directing step, a temperature of said sensor is maintained below a a temperature that would permanently damage the sensor.

7. The method of claim 2, wherein:
the sensor is a SAW torque sensor;
said carbon steel material comprises a button housing for the SAW torque sensor; and
said stainless steel comprises a parent material.

8. The method of claim 2, wherein:
the sensor is a SAW torque sensor;
said stainless steel material comprises a button housing for the SAW torque sensor; and
said carbon steel comprises a parent material.

9. A method for assembling a sensor package, comprising:
providing a sensor, a stainless steel part, and a carbon steel part, wherein the sensor is fixed relative to at least one of the stainless steel part and the carbon steel part, and wherein the stainless steel part and the carbon steel part are configured to be welded together;
positioning said stainless steel part and said carbon steel part in close proximity one to the other, thereby forming a weld line; and
cleaning the surfaces of said stainless steel part and said carbon steel part in the immediate vicinity of said weld line in order to remove surface contamination prior to the fusion of said stainless steel part and said carbon steel part;
clamping said stainless steel part and said carbon steel part in place in order to assure good alignment and to eliminate relative motion at said weld line during welding; and
directing a high energy density beam from a laser to said weld line thereby creating a weld in order to join said stainless steel part and said carbon steel part together to form the sensor package, wherein said high energy density beam creates a heat affected zone along said weld such that a temperature of the sensor in the sensor package is kept below 125 degrees Celsius.

10. The method of claim 9 wherein said weld is substantially free of solidification cracks.

11. The method of claim 9 wherein during said directing step, a temperature of said weld is maintained below a vaporization temperature of said stainless steel part and said carbon steel part.

12. The method of claim 9, wherein:
the sensor device is a SAW torque sensor,
said carbon steel part comprises a button housing for the SAW torque sensor; and
said stainless steel part comprises a parent material.

13. The method of claim 9, wherein:
the sensor device is a SAW torque sensor;
said stainless steel part comprises a button housing for the SAW torque sensor; and
said carbon steel part comprises a parent material.

14. The method of claim 9 wherein said weld exhibits a pull strength of 160 kN or more.

15. A method for assembling a sensor package, comprising:
providing a SAW torque sensor package comprising a SAW sensor inside of a stainless steel package, and a parent material comprised of carbon steel, said stainless steel package and said parent material to be welded together;

positioning said stainless steel package and said parent material in close proximity one to the other, thereby forming a weld line; and cleaning the surfaces of said stainless steel package and said parent material in the immediate vicinity of said weld line in order to remove surface contamination prior to the fusion of said stainless steel package and said parent material;

clamping said stainless steel package and said parent material in order to assure good alignment and to eliminate relative motion at said weld line during welding; and directing a high energy density beam to said weld line thereby creating a weld in order to join said stainless steel package and said parent material, wherein said high energy density beam creates a heat affected zone along said weld such that a temperature of the SAW torque sensor in the sensor package stainless steel package remains below 125 degrees Celsius.

16. The method of claim 15 wherein said high energy density beam is a laser beam.

17. The method of claim 15 wherein said weld is substantially free of solidification cracks.

18. The method of claim 15 wherein said weld exhibits a pull strength of 160 kN or more.

19. The method of claim 9, wherein the temperature of the sensor in the sensor package is kept below 100 degrees Celsius.

20. The method of claim 15, wherein the temperature of the SAW torque sensor in the sensor package stainless steel package remains below 100 degrees Celsius.

* * * * *